US012560562B2

(12) United States Patent (10) Patent No.: US 12,560,562 B2
DiDomizio et al. (45) Date of Patent: Feb. 24, 2026

(54) INSPECTION APPARATUS AND METHOD FOR INSPECTING A COMPONENT

(71) Applicants:GENERAL ELECTRIC COMPANY, Schenectady, NY (US); Bruker Nano GmbH, Berlin (DE)

(72) Inventors: Richard DiDomizio, Charlton, NY (US); Michael Christopher Andersen, Cincinnati, OH (US); Walter Vincent Dixon, III, Delanson, NY (US); Timothy Hanlon, Glenmont, NY (US); Wayne Lee Lawrence, Sardinia, OH (US); Ramkumar Kashyap Oruganti, Bangalore (IN); Jonathan Rutherford Owens, Glenville, NY (US); Daniel M. Ruscitto, Niskayuna, NY (US); Adarsh Shukla, Bangalore (IN); Eric John Telfeyan, Delanson, NY (US); Gregory Donald Crim, Middletown, OH (US); Michael Wylie Krauss, Cincinnati, OH (US); André Dziurla, Berlin (DE); Sven Martin Joachim Larisch, Berlin (DE); Falk Reinhardt, Berlin (DE); Roald Alberto Tagle Berdan, Berlin (DE); Henning Schroeder, Berlin (DE)

(73) Assignees: General Electric Company, Evendale, OH (US); Bruker Nano GmbH, Berlin (DE)

( * ) Notice: Subject to any disclaimer, the term of this patent is extended or adjusted under 35 U.S.C. 154(b) by 93 days.

(21) Appl. No.: 18/506,331

(22) Filed: Nov. 10, 2023

(65) Prior Publication Data

US 2024/0077438 A1 Mar. 7, 2024

(30) Foreign Application Priority Data

Sep. 15, 2023 (IN) .............................. 202311062181

(51) Int. Cl.
*G01N 35/00* (2006.01)
*G01N 23/223* (2006.01)

(52) U.S. Cl.
CPC ....... *G01N 23/223* (2013.01); *G01N 35/0099* (2013.01)

(58) Field of Classification Search
CPC .......................... G01N 23/223; G01N 35/0099
See application file for complete search history.

(56) References Cited

U.S. PATENT DOCUMENTS 3,966,852 A 6/1976 Neeb et al.
7,245,695 B2 7/2007 Mazor et al.
(Continued)

FOREIGN PATENT DOCUMENTS

CA 2843218 C 1/2013
CN 101498675 A 8/2009
(Continued)

*Primary Examiner* — Mark R Gaworecki
(74) *Attorney, Agent, or Firm* — Dinsmore & Shohl LLP

(57) ABSTRACT

An apparatus and method for an inspection apparatus for inspecting a component. The inspection apparatus including a robotic arm. A micro-XRF instrument having an instrument head coupled to the robotic arm. A seat supporting the component within a scanning area during inspection; and a computer in communication with the robotic arm and the micro-XRF instrument.

21 Claims, 4 Drawing Sheets

(56) References Cited

U.S. PATENT DOCUMENTS

| 7,689,003 B2 | 3/2010 | Shannon et al. |
| 8,221,825 B2 | 7/2012 | Reitz et al. |
| 9,228,941 B2 | 1/2016 | Arellano et al. |
| 9,513,238 B2 | 12/2016 | Kessler |
| 9,547,094 B2 * | 1/2017 | Rinsema ............... G01N 23/207 |
| 9,945,796 B2 | 4/2018 | Terashita |
| 10,201,831 B2 | 2/2019 | Sivaramakrishnan et al. |
| 11,067,448 B2 | 7/2021 | Campbell et al. |
| 11,187,692 B2 | 11/2021 | Weindoft et al. |
| 11,300,508 B2 | 4/2022 | Diamond |
| 11,410,298 B2 | 8/2022 | Finn et al. |
| 11,670,053 B2 | 6/2023 | Uher et al. |

FOREIGN PATENT DOCUMENTS

| CN | 104677701 A | 6/2015 |
| DE | 2153758 B2 | 3/1976 |
| EP | 1686369 B1 | 12/2010 |
| EP | 3677648 A1 | 7/2020 |
| IN | 406269 B | 11/2018 |
| SE | 539014 C2 | 1/2017 |
| WO | 2022167466 A1 | 8/2022 |

* cited by examiner

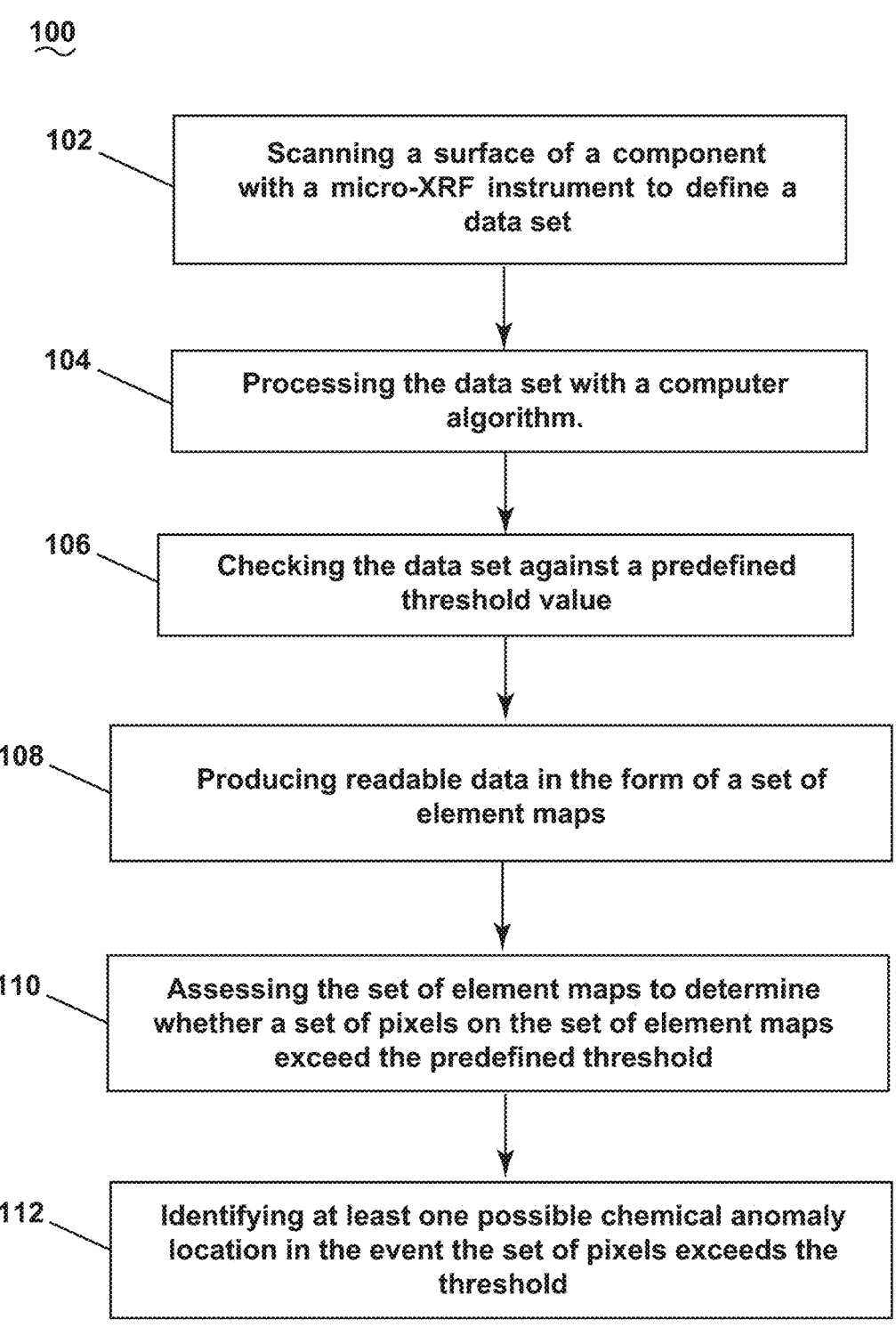

100

102 — Scanning a surface of a component with a micro-XRF instrument to define a data set 104 — Processing the data set with a computer algorithm.

106 — Checking the data set against a predefined threshold value

108 — Producing readable data in the form of a set of element maps

110 — Assessing the set of element maps to determine whether a set of pixels on the set of element maps exceed the predefined threshold 112 — Identifying at least one possible chemical anomaly location in the event the set of pixels exceeds the threshold

FIG. 4

INSPECTION APPARATUS AND METHOD FOR INSPECTING A COMPONENT

TECHNICAL FIELD

This disclosure generally relates to an inspection apparatus and more specifically to a method for inspecting the surface of a component for chemical anomalies.

BACKGROUND

Manufactured components require inspection before and during operation. Ultrasonic (UT) evaluation, macroetch, eddy current (ECI), X-ray/computed tomography (CT), and micro-X-ray fluorescence (XRF) are all technologies employed to inspect components. Each technology has limitations that make finding chemical anomalies on a surface of the manufactured component difficult or limited in scope. Additionally, inspection can be a slow process taking up considerable time and resources.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 4 is a flow chart illustrating a method for inspecting a component for chemical anomalies.

DETAILED DESCRIPTION

Figure 1:
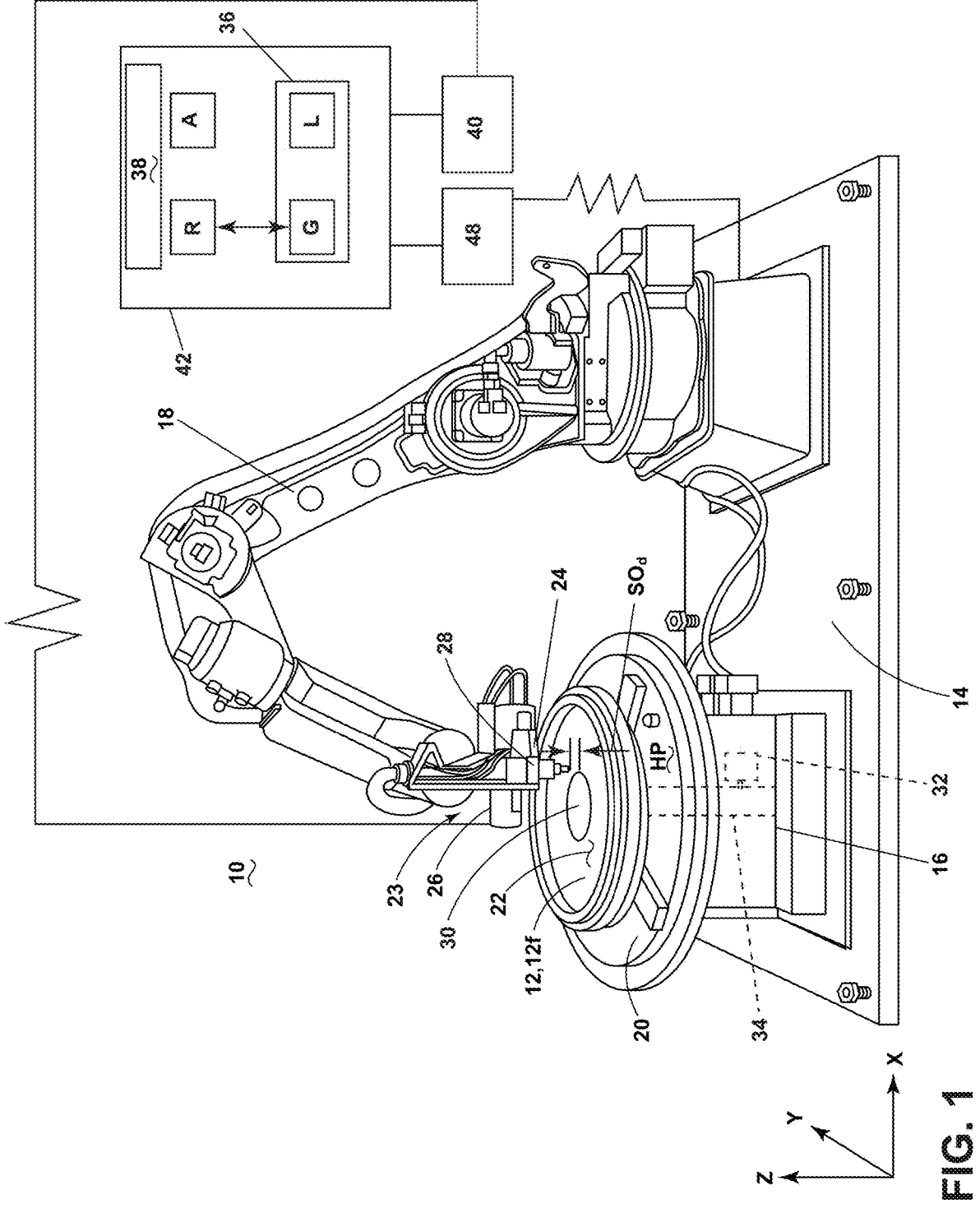
FIG. 1 is a schematic of an inspection apparatus for a component in communication with a computer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure Aspects of the disclosure generally relate to an inspection apparatus and method of inspecting a component, and more particularly to a micro-XRF inspection method for identifying potential chemical anomalies on the surfaces of a fielded component, by way of non-limiting example a turbine engine component. The turbine engine component can be from either a jet engine or a land based heavy-duty gas turbine. For purposes of illustration, the present disclosure will be described with respect to inspection of the surfaces of a turbine engine component. It will be understood, however, that aspects of the disclosure described herein are not so limited and may have general applicability within other inspection methods and apparatus outside of manufactured turbine engine components for jet engines, i.e. any component for a gas turbine engine is contemplated, whether the component is fielded or newly manufactured.

Some known inspection methods have shortcomings where the method and apparatus discussed herein overcome the shortcomings. Ultrasonic (UT) evaluation, for example, lacks the ability to find some chemical anomalies of interest in some implementations because the change in grain size within the chemical anomaly compared to the parent material is not significant enough to result in a change to the sound speed that is measurable. Macroetching requires a surface of the component be chemically attacked and the analysis of that surface is dependent on both the quality of the etch and the interpretation of the final microstructure, potentially resulting in a lower probability of detection than desired. Eddy current inspection (ECI) is unable to inspect for some smaller chemical anomalies on very rough surfaces, such as peened surfaces, and relies upon the interpretation of a signal driven by the microstructure and not a direct assessment of the component microstructure being inspected. X-ray/CT scanning can effectively find chemical anomalies that have a significant difference in density compared to the base metal. However, chemical anomalies with small differences in density compared to the base metal require section thicknesses that are thinner than production components, limiting its capability. Finally, historically micro-XRF inspection has been extremely time-consuming for larger components when searching for small chemical anomalies because the pixel size must be restricted to ensure enough signal is obtained within a potential chemical anomaly of interest. Additionally, typical micro-XRF systems are confined to an X/Y scan pattern with limited Z motion capabilities making them impractical for scanning complex geometry components, at least because the micro-XRF system and the component remain fixed with respect to each other. This fixed relationship causes the scanning distance between areas of the component and a detector of the micro-XRF system to vary throughout a scan as the component geometry changes.

The micro-XRF inspection method and apparatus discussed herein incorporates a micro-XRF head including an X-ray source and at least one detector as part of a robot and turn table system, utilizes a computer detection algorithm for identifying potential chemical anomalies on a surface of a component, and performs a multi-scan inspection method to decrease the historically long inspection time.

Aspects of the disclosure provide for an inspection method and inspection apparatus that utilize the micro-XRF technique to reduce the inspection (scan) time required to find surface chemical anomalies while still meeting precision and recall requirements. While a micro-XRF inspection method will be primarily utilized, it should be understood that aspects of the disclosure herein can be applied to other processes of inspection.

"Precision," as used herein, is a measure of the number of false positives found in a population and is given by the following ratio:(True Positive)/(True Positive+False Positive).

"Recall," as used herein, is a measure of the number of false negatives found in a population and is given by the following ratio: (True Positive)/(True Positive+False Negative).

"Chemical anomaly," as used herein, is a region under which the composition of one or more elements, or any combination of elements, has a statistically significant difference from other regions. Often, the chemical anomaly is a region that is statistically significantly different than the expected parent alloy that is formed into the component. Establishing statistical thresholds on variation found within the composition of elements based on a predetermined set of inspection requirements is a function of detection limits associated with the scanning instrument used and ultimately the speed under which the part can be scanned.

The term "high-speed scan" as used herein is in reference to a complete scan of a component surface or a predetermined portion of the component surface, completed as fast as possible while still meeting a predetermined set of inspection requirements.

The term "higher resolution" as used herein can be in reference to a spatial resolution, with a smaller pixel size, or referring to an increased signal produced by a slower scan rate. The higher resolution is with respect to the resolution, the signal-to-noise ratio of the high-speed scan, or both the resolution and the signal-to-noise ratio of the high-speed scan in that the resolution is improved in comparison.

The term "high-resolution scan" as used herein is in reference to a complete local scan centered around a possible chemical anomaly location. The high-resolution scan has a higher resolution and is based on the set of predetermined set of inspection requirements. In one aspect, the high-resolution scan can be performed after the high-speed scan is complete. In another aspect, the high-resolution scan occurs solely based on the set of inspection requirements.

The term "detection metrics" as used herein describes a series of inspection bounds that must be met in order to successfully inspect a component. These include achieving a required precision level and recall level, finding anomalies greater than a certain defined size, and finding anomalies of a certain shape. Specific detection metrics must be defined for each type of anomaly.

The term "element maps" as used herein describes a multi-channel pixelated dataset. Each pixel represents an area at a location defined in scan coordinates and a set of values that represents the integration of detector data within one or more energy windows or metadata associated with the readout occurring at the specified pixel location. Each channel represents an aggregation of detector data from one or more energy windows, which is often centered around specific X-ray fluorescence peak(s) or combinations of peaks. The energy window definitions used to create the element maps is analysis specific and can be tuned to specific signatures associated with the chemical anomalies being inspected for. Datasets can be collected via point, line, or area scans.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

FIG. 1 is an inspection apparatus 10 for inspecting a component 12. The inspection apparatus 10 can include a base 14 on which a seat 16 and a robotic arm 18 can be mounted. While illustrated as a robotic arm 18, the robotic arm can be a device which can position an object in space based on an operator coordinate input. This can be, for example but not limited to, a linear motor, a combination of linear motors and/or a rotary actuator. The seat 16 can include a turn table 20 on which the component 12 can be placed for inspecting a surface 22 of the component 12. A micro-XRF instrument 23 is coupled to the robotic arm 18 and can include an instrument head 24, an X-ray excitation source 26 and at least one X-ray detector 28. The instrument head 24 can be movable in at least one dimension of a 3-D space illustrated as an XYZ axis. It is contemplated that the instrument head 24 is moveable along the x-axis, the y-axis, and the z-axis by the robotic arm 18. The turn table 20 can provide rotational movement about a line parallel to the Y-axis located at the center of the component 12 and defining a horizontal plane (denoted "HP") perpendicular to the y-axis. The instrument head 24 can be rotatable with respect to the horizontal plane HP for providing the necessary mobility to access areas like, by way of non-limiting example a bore hole 30 in the component 12. While a turn table 20 is rotatable in any plane, including the horizontal plane illustrated, it should be understood that vertical and angled rotation are also contemplated. Further, the component 12 can remain stationary while the instrument head 24 moves around an entirety of the component 12. Further still, the instrument head 24 can remain stationary while the component 12 moves in the 3-D space. An encoder 32 can be located on a shaft 34 (both schematically illustrated in dashed line) of the turn table 20 for determining the location of the component 12 during operation. In other words, the encoder 32 can provide positional information to a computer 42 during operation.

Typical micro-XRF instruments cannot be used for industrial inspection of complex shaped parts due to motion limitations. Current micro-XRF instruments are confined to a motion system that largely restricts access in two dimensions ("X" and "Y"). While units do have the ability to vary the stand-off distance to the part being inspected ("Z"), this distance cannot be varied during the acquisition of a map, described herein as an element map. Rather, typical micro-XRF instruments are only available to perform individual spot analysis when the part has significant height variation. Further, typical systems do not allow for variation of the instrument head distance to the part surface during the map collection to account for the changing contours of complex shaped parts. Being able to maintain a constant distance and angle between the micro-XRF head and the part surface ensures that a consistent signal is being collected. Without a consistent signal, the detection algorithm A cannot be universally implemented.

The micro-XRF instrument 23 described herein overcomes these limitations by attaching the X-ray excitation source 26 and the at least one X-ray detector 28 to the robotic arm 18 that can manipulate a stand-off distance $SO_d$ and an angle of the at least one X-ray detector 28 as a function of the component 12 geometry. In other words, the robotic arm 18 provides the instrument head 24 movement about the component 12 while maintaining the stand-off distance $SO_d$ from the surface 22 of the component 12. The robotic arm 18 enables full control of the stand-off distance $SO_d$ and angle, providing maintenance of a constant stand-off distance $SO_d$ during inspection.

The component 12 can be a fielded component 12f, having been in use for a predetermined amount of time and ready for inspection. The fielded component 12f can be an engine component, and more particularly a jet engine component. Further, the component 12 can be a heavy-duty gas turbine component. Additionally, the component 12 can be a new make component, billet, a forging, or a casting.

A micro-XRF controller 40 can be in communication with the micro-XRF instrument 23, and a robot controller 48 can be in communication with the robotic arm 18. Both wired communication and/or wireless communication are contemplated. Further, either or both of the controllers 40, 48 can be integral with the inspection apparatus 10 and the computer 42. Further, the encoder 32 can be in communication with the robot controller 48. The robot controller 48 can include scanning instructions 36 for the surface 22 that are broken up into scanning modules. These modules vary a scanning area and a set of micro-XRF parameters, so that when combined they minimize or otherwise reduce the overall inspection time while meeting a required set of detection metrics. The micro-XRF inspection parameters can include tube excitation parameters, speed of scan head relative to the part surface, spot and pixels size, head standoff, and angle constrained by part-geometry limitations.

A single scan module can be utilized. It is also contemplated that multiple scan modules are used in series. In one non-limiting example, the scanning instructions include a global scan module (denoted "G") and a local scan module (denoted "L"). Further, the computer 42 can include a detection algorithm (denoted "A") and a user interface 38. In one non-limiting example, an operator can be in communication with the controllers 40, 48 to initiate the scanning instructions 36 via the robot controller 48 and to input instructions via the micro-XRF controller 40 related to a predetermined set of inspection requirements (denoted "R") including scan locations, direction, and speed.

The predetermined set of inspection requirements R can further include predetermined boundaries of normal chemical variations input into the global scan module G prior to scanning. The set of predetermined boundaries can be input by an operator or from a database, or from a combination of an operator and database. The predetermined set of inspection requirements R can vary depending on the type of component 12 being inspected. The predetermined set of inspection requirements R can be input into the computer and relayed to the controller 40 before the inspection process begins. The predetermined set of inspection requirements R can include a pre-defined threshold value that is established based on, by way of non-limiting example, historical data.

The global scan module G includes instructions for scanning the surface 22 of the component 12 at a high-speed scan. The high-speed scan as described herein can be performed by movement of the component 12, or in other aspects, movement of the robotic arm 18. Regardless, the objective of the high-speed scan is to scan the surface 22 in as fast a time as is possible while still maintaining the predetermined set of inspection requirements R.

The detection algorithm A is a computer algorithm implemented to output information regarding the collected data sets of element maps 54 on the surface 22 of the engine component 12 based on information received from the high-speed scan. Further, the detection algorithm A can include the ability to assess the cleanliness of the surface 22 of the component 12 in order to identify targeted cleaning locations.

Generally, software can be utilized to communicate with the controllers 40, 48. The software can set parameters for the instrument head 24 including voltage, current, and detector read out settings. The X-ray detector 28 collects an XRF signal that is processed via the software for the micro-XRF controller and sent in parallel to the user interface 38 and to the detection algorithm A for processing and simultaneous display. Upon completion of the detection algorithm A, information shared via the user interface 38 is updated.

The local scan module L includes instructions for scanning only locations identified by the detection algorithm A. The local scan module L is completed at a high-resolution scan having a higher precision level than the high-speed scan. This results in an overall decrease in inspection time over what a slower high-speed scan would require to complete the entire process with a same precision level. It should be understood that the local scan module L occurs after, or in series with, the global scan module G.

Any of the scan modules can include instructions that include rotating the turn table 20 in full 360° revolutions while the robotic arm 18 radially moves the instrument head 24. It is further contemplated that the instructions can include rotating the turn table 20 back and forth in arcs. Simultaneously the robotic arm 18 can radially move the instrument head 24. Rotating the turn table while simultaneously radially moving the instrument head can produce a spiral scan. Rotating the turn table while having a fixed instrument head can produce ring scans. Concentric ring scans can be assembled by moving the head radially by one pixel width at the completion of each revolution. Further, scanning can include moving the robotic arm 18 while the component 12 remains stationary. For example, the robotic arm 18 moves linearly back and forth over a stationary component 12 over the region that covers the possible chemical anomaly locations identified. It should be understood that scanning as discussed herein can be any combination of the rotating of the turn table 20 or movement of the robotic arm 18 with the other of the robotic arm 18 or the turn table 20 remaining stationary.

Figure 2:
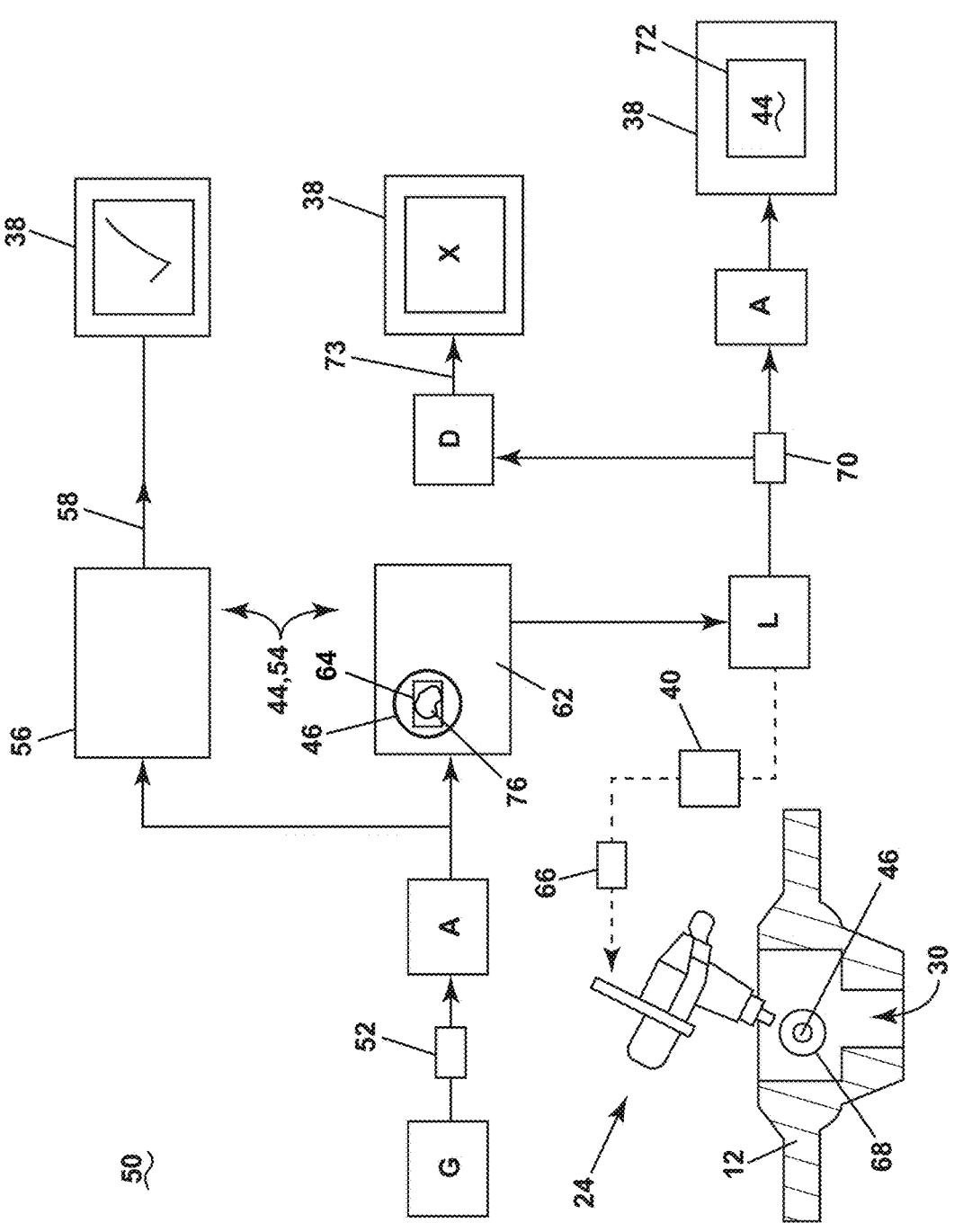
FIG. 2 is a schematic of an inspection process using the inspection apparatus and including a local scan module.

Turning to FIG. 2, a schematic of an inspection process 50 is illustrated. The global scan module G returns a global data set 52 produced by the high-speed scan. The global data set 52 has a resolution high enough for detecting possible chemical anomaly locations 46 at a high enough recall level while the high-speed scan is fast enough to efficiently scan the surface 22. This balance is determined by the component 12, the material from which the component 12 is formed, and the potential chemical anomaly 76 being inspected for, such that the global scan module G meets all predetermined inspection requirements R for the component 12. Scanning at the high-speed scan can include rotating the turn table 20 in full 360° revolutions while the robotic arm 18 radially moves the instrument head 24. Further, scanning with the high-speed scan can include moving the robotic arm 18 while the component 12 remains stationary.

Upon completion of the global scan module G, the detection algorithm A is implemented. The detection algorithm A processes the global data set 52 via the computer 42. Anomaly detection is based on determining statistical deviations from baseline composition. In one example, the detection algorithm A includes a series of steps including denoising the element maps 54, selecting specific element maps 54 indicative of a surface or a structural anomaly being screened for, and calculating deviations in intensity from the central tendency to identify a potential chemical anomaly 76. In one example, denoising uses a bilateral filter algorithm to reduce sensitivity to X-ray detector noise sources, while preserving the spatial consistency of boundary conditions, including the anomalies. The median absolute deviation (MAD) is calculated for each pixel in each of the selected element maps 54. The MAD results are then combined via quadrature summation. The MAD algorithm is part of a family of M-estimator methods that provide a robust measure of variability in a univariate sample. A threshold is then applied to the distribution in the combined samples to establish the predetermined set of inspection requirements R for anomaly detection.

The detection algorithm A can produce readable data 44 in the form of a first set of element maps 54 representing the surface 22 of the component 12. The readable data 44 can include a first set of element maps 54 output from the high-speed scan. In one non-limiting example the first set of element maps 54 can be two-dimensional. The first set of element maps 54 can be processed to locate any possible chemical anomaly locations 46 on the surface 22. In the event that the potential chemical anomaly 76 is detected, the detection algorithm can further include marking the possible chemical anomaly location 46 with a flag 64 to provide a physical record of the possible chemical anomaly location 46. The detection algorithm A can utilize different processes for detection. In one example, the flag 64 is based on a direct chemical assessment detected on the surface 22. In another example, the detection algorithm A can work by detecting differences from a baseline, by way of non-limiting example a chemical background. In yet another example, the detection algorithm A can work by directly detecting a chemical anomaly of interest.

In one example, if the surface 22 meets the predetermined set of inspection requirements R associated with the presence of any chemical anomalies, a first element map 56 free of any flags 64, is produced by the detection algorithm A. In this case, a signal 58 indicating that the component 12 meets the predetermined set of inspection requirements R, can be sent to an operator, via, by way of non-limiting example, the user interface 38.

Some specific examples of chemical anomalies that can occur in turbine engine components are freckles, white spots, dirty white spots, stringers, oxidation, corrosion, and loss of coating. Freckles are chemical anomalies formed during solidification as a result of interdentritic micro segregation and fluid flow of the liquid alloy. White spots, dirty white spots, and stringers are chemical anomalies caused by the incomplete melting of melt material that falls into the liquid pool during the final melting step. Oxidation occurs when a metal reacts with oxygen in the atmosphere to form an oxide. Corrosion occurs when a metal reacts with contamination in the combustion process resulting in low melting compounds attacking the metal surface. A loss of coating occurs when chips or spalls in the applied coating occur, allowing the operating environment access to the underlying substrate. All these chemical anomalies result in a surface chemistry in the location of the anomaly that is statistically differentiable from the starting baseline chemistry.

At the conclusion of the high-speed scan, the first set of element maps 54 and corresponding metadata are processed by computer 42 via the detection algorithm A. In another example, when the presence of possible chemical anomalies is detected, the first set of element maps 54 includes a second element map 62 including flags 64. The local scan module L is initiated in the event the readable data 44 produced includes flags 64.

If the detection algorithm A returns the first set of element maps 54 including the second element map 62, software initiates the high-resolution scan by sending instructions 66 to the robot controller 48 and the micro-XRF controller 40 for scanning the surface 22 of the component 12. These instructions 66 can include only scanning a predetermined area 68 of the surface 22 around the possible chemical anomaly locations 46 corresponding with each flag 64. Instructions for the robotic arm 18 can include scanning at the high-resolution scan and can include rotating the turn table 20 back and forth in short arcs that cover the predetermined area 68 of the surface 22. Simultaneously the robotic arm 18 can radially move the instrument head 24 while maintaining the stand-off distance $SO_d$ as described herein. The local scan module L returns a local data set 70 associated with each possible chemical anomaly location 46.

Upon completion of the local scan module L, an algorithm is implemented. In one non-limiting example the detection algorithm A is implemented again. It should be understood, however, that any algorithm is contemplated. The detection algorithm A processes the local data set 70 via the computer 42 to produce readable data 44 including a second set of element maps 72 representing the predetermined area 68 of the surface 22. The readable data 44 is then presented for review to an operator, again, via, by way of non-limiting example, the user interface 38 to make a determination regarding the presence of a possible chemical anomaly.

While an operator can make a final determination regarding the presence of a chemical anomaly, it is contemplated that the computer includes an anomaly determination module (denoted "D") where the computer determines an actual chemical anomaly is in fact present on the component 12. In one example, a component 12 has an oxidation resistant overlay coating of a different chemical composition applied to the surface. In one area the overlay coating is missing, exposing the surface of component 12. The lack of coating is a chemical anomaly of the intended surface and can be automatically detected and translated into a signal 73. In this case, the signal 73 indicating that the component 12 has a loss of coating, which defines a chemical anomaly, is sent to an operator, via, again, by way of a non-limiting example, the user interface 38.

Figure 3:
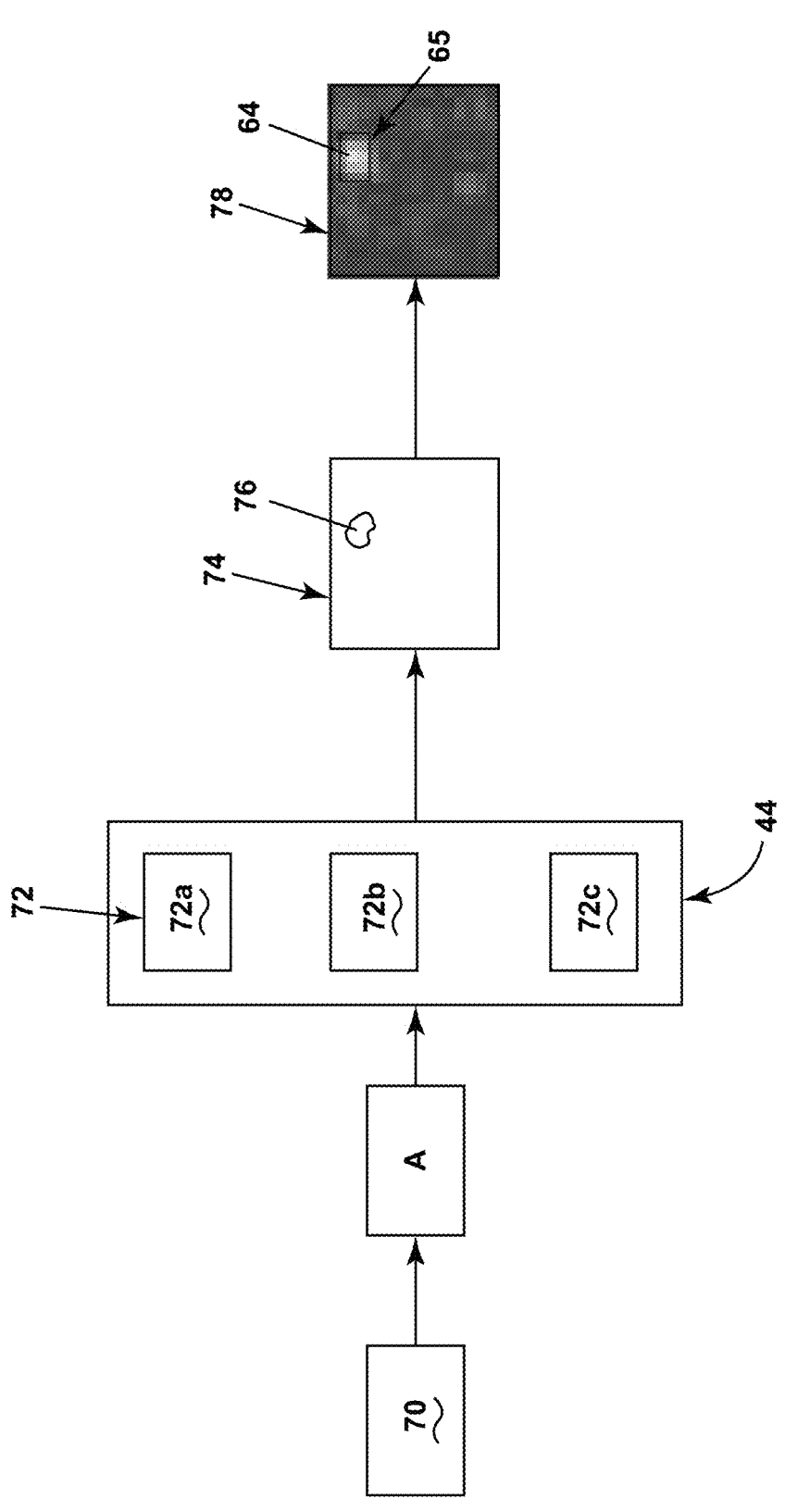
FIG. 3 is a schematic of processing a local data set from the local scan module.

Turning to FIG. 3, a more detailed schematic of processing the local data set 70 is illustrated. The second set of element maps 72 can be a collection of, by way of non-limiting example, three element maps 72a, 72b, 72c, tuned to specific signatures associated with the different elements. In one non-limiting example the specific signatures are specific to metallic elements. In one aspect, an enhanced map 74, by way of non-limiting example a de-noised map determined from the detection algorithm A and showing the potential chemical anomaly 76 is derived from the second set of element maps 72. Specific sets of detection metrics must be defined for each type of potential chemical anomaly 76 and base material type.

The detection algorithm A can include determining a threshold map 78 with flags 64 where a set of pixels 65, the set of pixels 65 being at least one pixel, on the enhanced map 74 exceed the pre-defined threshold value based on an as-inspected state of the component surface 22 as determined by the second set of element maps 72. The as-inspected state refers to utilizing the component surface 22 to establish a total chemical distribution which is reflected in the second set of element maps 72. The possible chemical anomaly locations 46 can be associated with the presence of a freckle, a dirty white spot, or a stringer on the surface 22. Further, possible chemical anomaly locations 46 can include oxidation, corrosion, repair, chemical etchings, loss of a coating, or a local region that deviates from the intended base metal composition as defined by the expected alloy statistical signature. A subsequent determination as to whether the flag 64 is confirmed to be a true chemical anomaly can then be carried out.

In one non-limiting example the threshold map 78 can be presented side-by-side with the second set of element maps 72 associated with the possible chemical anomaly location 46. An operator or user can then make a determination regarding whether the possible chemical anomaly location 46 matches the potential chemical anomaly or the possible chemical anomaly location 46 is a false positive.

The high-resolution scan results in a slower inspection speed than was utilized in the high-speed scan. Limiting the area covered by the slower high-resolution scan to the predetermined area 68 of the surface reduces the overall scan time. The higher resolution of the high-resolution scan enables a higher recall level and a higher precision level than was achieved with the high-speed scan. The higher recall level and the higher precision level of the high-resolution scan provides greater confidence in determining whether the potential anomaly identified with the global scan module G is a true positive (a chemical anomaly of concern) or a false positive (not a chemical anomaly of concern). The detection algorithm A as described herein is tuned to minimize the number of false positives to achieve a precision level as close to 100% as possible and to minimize the number of false negatives to achieve a recall level as close to 100% as possible.

Turning to FIG. 4, a flow chart of a method 100 for inspecting the component 12 for surface connected chemical anomalies is illustrated. At block 102, the surface 22 of the component 12 is scanned with the micro-XRF instrument 23 to define a data set. In one non-limiting example, the scanning can include scanning at the high-speed scan to define the global data set 52. In another non-limiting example, the scanning can include scanning at the high-resolution scan to define the local data set 70. At block 104, the data set 52, 70 is processed with a computer algorithm, such as, by way of non-limiting example the detection algorithm A. At block 106, the local data set 70 is checked, with the computer algorithm, against the pre-defined threshold value. At 108, readable data 44 is produced, with the computer algorithm, in the form of the set of element maps 54. At 110, the set of element maps 54 is assessed to determine whether the set of pixels 65 on the set of element maps exceeds the pre-defined threshold value. The set of element maps 54 can be assessed using, by way of non-limiting example, the MAD algorithm described herein. At 112 the at least one possible chemical anomaly location 46 is identified, with the computer algorithm, in the event the set of pixels 65 exceeds the pre-defined threshold value. In other words, when the composition of the surface 22 is determined to be outside of the statistical deviation from the baseline composition.

The method 100 can further include moving the component 12 while scanning with the micro-XRF instrument 23. The method 100 can further include moving the instrument head 24 while scanning the component 12. The method 100 can also include marking any possible chemical anomaly location 46 with at least one flag 64.

The detection algorithm A described herein can further include collating relevant elemental signals-of-interest, prefiltering of signal noise, smoothing of input data, and statistical analysis for anomaly detection, with the set of micro-XRF parameters optimized based on real scan data. In another embodiment, the detection algorithm A described herein can further include collating relevant elemental signals-of-interest and ground-truth information to leverage machine learning or deep learning approaches for anomaly detection.

Benefits associated with the disclosure discussed herein include decreasing an inspection time for inspecting fielded engine components while meeting a required set of detection metrics. In other non-limiting examples, benefits can include decreasing inspection time for non-fielded components or for components in industrial quality control. Decreasing the inspection time while maintaining inspection requirements clears components for operations in a more timely manner benefiting consumers and manufacturers.

It should be understood that any combination of the geometry related to the inspection apparatus discussed herein is contemplated. The varying aspects of the disclosure discussed herein are for illustrative purposes and not meant to be limiting. It should be appreciated that application of the disclosed design can be applicable for any components, including fielded components from any engine include a jet engine where the component is made of a material capable of producing chemical anomalies.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure herein are provided by the subject matter of the following clauses:

An inspection apparatus for inspecting a component for surface connected chemical anomalies, the inspection apparatus comprising a robotic arm; a micro-XRF instrument comprising an instrument head coupled to the robotic arm, the instrument head including an X-ray excitation source and at least one X-ray detector; a seat supporting the component within a scanning area during inspection; and a computer in communication with at least the robotic arm and micro-XRF instrument, the computer comprising: at least one scan module comprising instructions to scan with the micro-XRF instrument a surface of the component, and to collect and assemble element maps output from the scan; and a detection algorithm comprising the ability to assess the element maps collected from the micro-XRF instrument to identify possible chemical anomaly locations on the surface of the component while achieving a required set of detection metrics.

The inspection apparatus of any preceding clause wherein the at least one scan module includes a local scan module comprising instructions to scan with the micro-XRF instrument the possible chemical anomaly locations on the surface of the component identified by the detection algorithm.

The inspection apparatus of any preceding clause wherein the at least one scan module includes a global scan module comprising instructions to scan at a high-speed with the micro-XRF instrument a surface of the component prior to the local scan module, and to collect and assemble element maps output from the scan for analyzing with the detection algorithm.

The inspection apparatus of any preceding clause where a set of micro-XRF parameters are chosen such that the local scan module occurs at a higher resolution than the global scan module.

The inspection apparatus of any preceding clause wherein the seat comprises a turn table rotatable in at least one plane.

The inspection apparatus of any preceding clause wherein the at least one scan module includes instructions to rotate the turn table in full revolutions while the robotic arm radially moves the micro-XRF instrument.

The inspection apparatus of any preceding clause wherein the at least one scan module includes instructions to rotate the turn table back and forth in short while the robotic arm radially moves the micro-XRF instrument.

The inspection apparatus of any preceding clause wherein the at least one scan module includes instructions to rotate the turn table back and forth in short arcs that cover the possible chemical anomaly locations identified while the robotic arm radially moves the micro-XRF instrument.

The inspection apparatus of any preceding clause wherein the robotic arm is movable in at least one dimension about the scanning area.

The inspection apparatus of any preceding clause wherein the at least one scan module includes instructions to move the robotic arm back and forth over a stationary component.

The inspection apparatus of any preceding clause wherein the detection algorithm further comprises determining the presence of a surface chemical anomaly by identifying a set of pixels that lie outside a pre-defined threshold value based on the as-inspected state of the component surface as determined by the element maps.

The inspection apparatus of any preceding clause further comprising a user interface for viewing the set of element maps.

A method of inspecting a component for surface connected chemical anomalies, the method comprising scanning the surface of the component with a micro-XRF instrument to define a data set; and processing the data set with a computer algorithm, the computer algorithm comprising: producing readable data in the form of a set of element maps and assessing the set of element maps to determine whether a set of pixels on the set of element maps exceed a pre-defined threshold value and identifying at least one possible chemical anomaly location in the event the set of pixels exceeds the pre-defined threshold value.

The method of any preceding clause wherein scanning the surface comprises scanning the at least one possible chemical anomaly location with the micro-XRF instrument with a high-resolution scan to define a local data set.

The method of any preceding clause wherein scanning the surface comprises scanning the surface with a high-speed scan to define a global data set prior to scanning with the high-resolution scan.

The method of any preceding clause wherein the computer algorithm further comprises identifying the at least one possible chemical anomaly location from the global data set where the set of pixels on the set of element maps exceed the pre-defined threshold value.

The method of any preceding clause further comprising processing the local data set and marking any possible anomaly location with a flag to define a threshold map with at least one flag.

The method of any preceding clause further comprising determining whether a set of pixels in the threshold map with the at least one flag exceeds the pre-defined threshold value.

The method of any preceding clause further comprising, in the event the set of pixels exceed the pre-defined threshold value, sending the threshold map with the at least one flag to a user interface.

The method of any preceding clause further comprising moving the XRF-instrument while scanning.

The method of any preceding clause further comprising moving the component while scanning.

The invention claimed is:

1. An inspection apparatus for inspecting a component for surface connected chemical anomalies, the inspection apparatus comprising:
   a robotic arm;
   a micro-XRF instrument comprising an instrument head coupled to the robotic arm, the instrument head including an X-ray excitation source and at least one X-ray detector; and
   a computer in communication with at least the robotic arm and micro-XRF instrument, the computer comprising:
      at least one scan module comprising instructions to scan with the micro-XRF instrument a surface of the component, and to collect and assemble element maps output from the scan; and
      a detection algorithm comprising instructions to assess the element maps collected from the micro-XRF instrument to identify possible chemical anomaly locations on the surface of the component while achieving a required set of detection metrics;
   wherein the robotic arm moves the instrument head about the component to scan the component while maintaining a distance from a surface of the component.

2. The inspection apparatus of claim 1 wherein the at least one scan module includes a local scan module comprising instructions to scan with the micro-XRF instrument the possible chemical anomaly locations on the surface of the component identified by the detection algorithm.

3. The inspection apparatus of claim 2 wherein the at least one scan module includes a global scan module comprising instructions to scan at a high-speed with the micro-XRF instrument a surface of the component prior to the local scan module, and to collect and assemble element maps output from the scan for analyzing with the detection algorithm.

4. The inspection apparatus of claim 3 where a set of micro-XRF parameters are chosen such that the local scan module occurs at a higher resolution than the global scan module.

5. The inspection apparatus of claim 1 wherein the robotic arm is movable in at least one dimension about a scanning area.

6. The inspection apparatus of claim 5 wherein the at least one scan module includes instructions to move the robotic arm back and forth over a stationary component.

7. The inspection apparatus of claim 1 wherein the detection algorithm further comprises determining a presence of a surface chemical anomaly by identifying a set of pixels that lie outside a pre-defined threshold value based on an as-inspected state of the component surface as determined by the element maps.

8. The inspection apparatus of claim 1 further comprising a user interface for viewing the set of element maps.

9. The inspection apparatus of claim 1 further comprising a seat supporting the component within a scanning area during inspection.

10. The inspection apparatus of claim 9 wherein the seat comprises a turn table rotatable in at least one plane.

11. The inspection apparatus of claim 10 wherein the at least one scan module includes instructions to rotate the turn table in full revolutions while the robotic arm radially moves the micro-XRF instrument.

12. The inspection apparatus of claim 10 wherein the at least one scan module includes instructions to rotate the turn table back and forth in short arcs while the robotic arm radially moves the micro-XRF instrument.

13. A method of inspecting a component for surface connected chemical anomalies, the method comprising:

scanning the surface of the component with a micro-XRF instrument to define a data set, the micro-XRF instrument positioned on a robotic arm to maintain a distance with respect to the surface of the component during the scan; and processing the data set with a computer algorithm, the computer algorithm comprising: producing readable data as a set of element maps and assessing the set of element maps to determine whether a set of pixels on the set of element maps exceed a pre-defined threshold value and identifying at least one possible chemical anomaly location when the set of pixels exceeds the pre-defined threshold value.

14. The method of claim 13 wherein scanning the surface comprises scanning the at least one possible chemical anomaly location with the micro-XRF instrument with a high-resolution scan to define a local data set.

15. The method of claim 14 wherein scanning the surface comprises scanning the surface with a high-speed scan to define a global data set prior to scanning with the high-resolution scan.

16. The method of claim 15 wherein the computer algorithm further comprises identifying the at least one possible chemical anomaly location from the global data set where the set of pixels on the set of element maps exceed the pre-defined threshold value.

17. The method of claim 14 further comprising processing the local data set and marking any possible anomaly location with a flag to define a threshold map with at least one flag.

18. The method of claim 17 further comprising determining whether a set of pixels in the threshold map with the at least one flag exceeds the pre-defined threshold value.

19. The method of claim 18 further comprising, when the set of pixels exceed the pre-defined threshold value, sending the threshold map with the at least one flag to a user interface.

20. The method of claim 13 further comprising moving the micro XRF-instrument while scanning.

21. The method of claim 13 further comprising moving the component while scanning.

* * * * *